(12) United States Patent
Chin et al.

(10) Patent No.: US 10,757,705 B2
(45) Date of Patent: Aug. 25, 2020

(54) MOBILE STATION, BASE STATION, AND COMMUNICATION CONTROL METHOD

(71) Applicant: NTT DOCOMO, INC., Tokyo (JP)

(72) Inventors: Hiroshi Chin, Tokyo (JP); Hideaki Takahashi, Tokyo (JP); Kengo Yagyu, Tokyo (JP); Kohei Kiyoshima, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/146,246

(22) Filed: Sep. 28, 2018

(65) Prior Publication Data
US 2019/0037572 A1    Jan. 31, 2019

Related U.S. Application Data

(63) Continuation of application No. 15/114,276, filed as application No. PCT/JP2015/051469 on Jan. 21, 2015, now abandoned.

(30) Foreign Application Priority Data

Jan. 28, 2014   (JP) ................................ 2014-013745

(51) Int. Cl.
    *H04W 72/04*   (2009.01)
    *H04W 36/00*   (2009.01)
    *H04W 84/04*   (2009.01)

(52) U.S. Cl.
    CPC ... *H04W 72/0453* (2013.01); *H04W 36/0083* (2013.01); *H04W 72/0413* (2013.01); *H04W 72/04* (2013.01); *H04W 84/042* (2013.01)

(58) Field of Classification Search
    CPC .................................................. H04W 72/0453
    See application file for complete search history.

(56) References Cited

U.S. PATENT DOCUMENTS

| | | | |
|---|---|---|---|
| 2011/0274007 A1 | 11/2011 | Lin et al. | |
| 2012/0252487 A1* | 10/2012 | Siomina | G01S 5/0205 455/456.1 |
| 2012/0263054 A1 | 10/2012 | Kazmi et al. | |
| 2013/0107742 A1* | 5/2013 | Ishii | H04L 5/001 370/252 |

(Continued)

FOREIGN PATENT DOCUMENTS

| | | |
|---|---|---|
| CN | 102325334 A1 | 1/2012 |
| CN | 103004254 A1 | 3/2013 |
| JP | 2012004608 A | 1/2012 |

OTHER PUBLICATIONS

International Search Report issued in corresponding application No. PCT/JP2015/051469 dated Apr. 28, 2015 (4 pages).

(Continued)

*Primary Examiner* — John D Blanton
(74) *Attorney, Agent, or Firm* — Osha Liang LLP

(57) ABSTRACT

A mobile station which configures a plurality of component carriers to communicate with a base station is discloses herein including a reception unit configured to receive from the base station a gap pattern according to which a portion of an inter-frequency measurement duration is used for data communication and a communication control unit configured to control communication according to the gap pattern.

7 Claims, 6 Drawing Sheets

(56) References Cited

U.S. PATENT DOCUMENTS

2013/0201884 A1   8/2013   Freda et al.
2015/0189516 A1   7/2015   Seo et al.

OTHER PUBLICATIONS

Written Opinion of the International Searching Authority issued in corresponding application No. PCT/JP2015/051469 dated Apr. 28, 2015 (3 pages).
Ericsson, "PCell interruption due to inter-frequency/inter-RAT measurements without gaps"; 3GPP TSG-RAN WG4 Meeting #69, R4-136549; San Francisco, USA; Nov. 11-15, 2013 (3 pages).
NTT DOCOMO, "Discussion on interruptions in measurement without gaps"; 3GPP TSG-RAN WG4 Meeting #70, R4-140766; Prague, Czech Republic; Feb. 10-14, 2014 (3 pages).
3GPP TS 36.133 V11.6.0, "3rd Generation Partnership Project; Technical Specification Group Radio Access Network; Evolved Universal Terrestrial Radio Access (E-UTRA); Requirements for support of radio resource management (Release 11)"; Section 8.1.2.1; Sep. 2013 (783 pages).
Extended European Search Report issued in the counterpart European Patent Application No. 15743081.0, dated Dec. 6, 2016 (14 pages).
3GPP TS 36.133 V12.2.0; "3rd Generation Partnership Project; Technical Specification Group Radio Access Network; Evolved Universal Terrestrial Radio Access (E-UTRA); Requirements for support of radio resource management (Release 12)"; Jan. 2014 (137 pages).
3GPP TS 36.331 V12.0.0; 3rd Generation Partnership Project; Technical Specification Group Radio Access Network; Evolved Universal Terrestrial Radio Access (E-UTRA); Radio Resource Control (RRC); Protocol specification (Release 12); Dec. 2013 (350 pages).
Office Action issued in corresponding Japanese Patent Application No. 2014-013745, dated Sep. 5, 2017 (5 pages).
Nokia Corporation et. al.; "Pcell interrupts due to single chip implementation"; 3GPP TSG-RAN WG4 Meeting #68, R4-134174; Barcelona, Spain, Aug. 19-23, 2013 (3 Pages).
Qualcomm Incorporated; "Inter-freguency Measurements Without Gaps"; 3GPP TSG-RAN WG4 Meeting #69, R4-136138; San Francisco, U.S.A, Nov. 11-15, 2013 (2 Pages).
Nokia Corporation et. al.; "Inter-frequency measurements gap for UE with single chip implementation" 3GPP TSG-RAN WG4 Meeting #69, R4-136836; San Francisco, USA, Nov. 11-15, 2013 (3 Pages).
Samsung; "Discussion on PCell interruption"; 3GPP TSG-RAN WG2 Meeting #82, R2-131825; Fukuoka, Japan, May 20-24, 2013 (4 Pages).
Extended European Search Report issued in counterpart European Patent Application No. 19177636.8, dated Jul. 30, 2019 (15 Pages).
3GPP TS 36.133 V12.2.0; "3rd Generation Partnership Project; Technical Specification Group Radio Access Network; Evolved Universal Terrestrial Radio Access (E-UTRA); Requirements for support of radio resource management (Release 12)"; Dec. 2013 (512 Pages).
Office Action issued in the counterpart Chinese Patent Application No. 201580006145.5, dated Oct. 8, 2018 (19 pages).

* cited by examiner

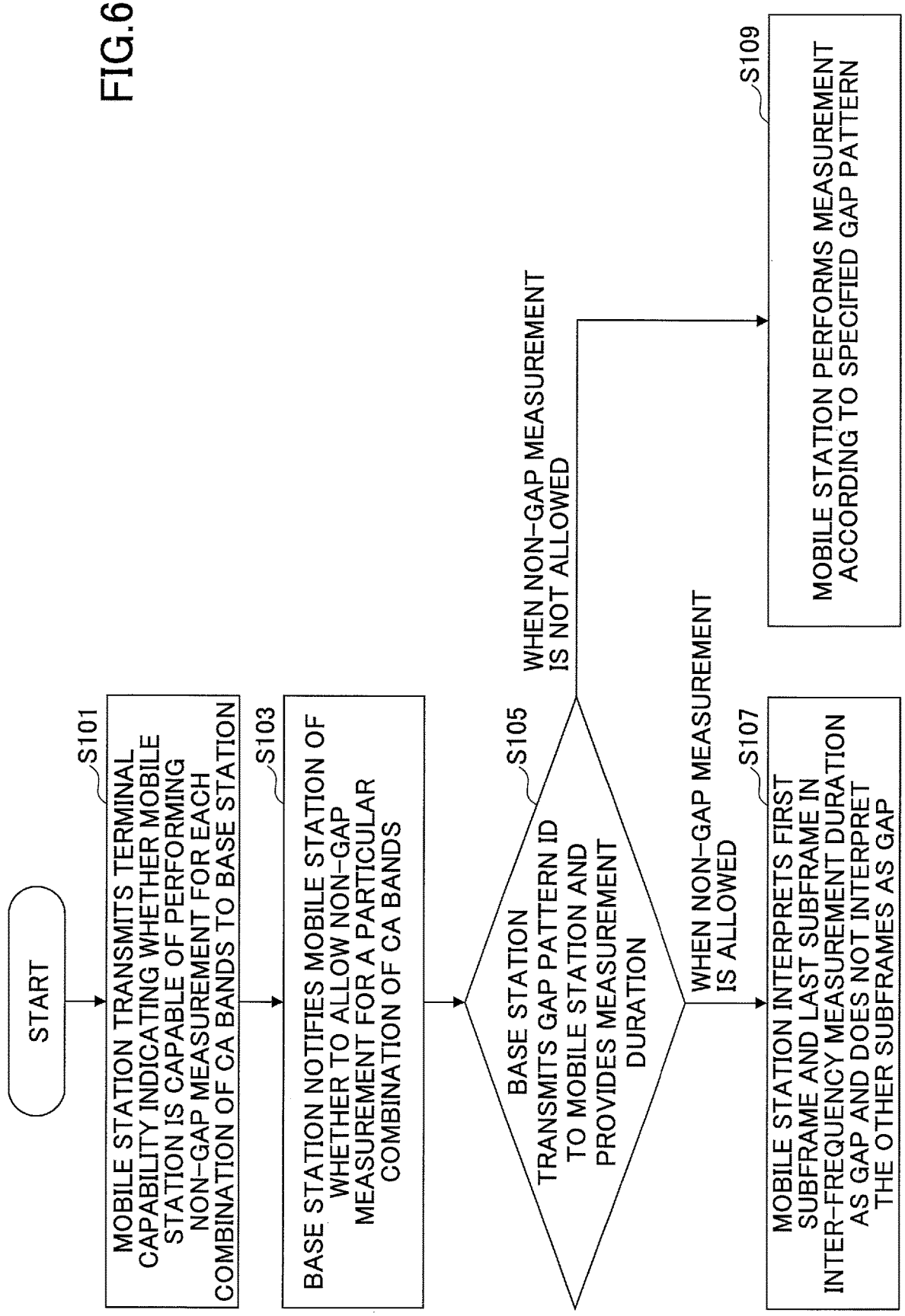

MOBILE STATION, BASE STATION, AND COMMUNICATION CONTROL METHOD

CROSS-REFERENCE TO RELATED APPLICATIONS

The present application is a continuation application of U.S. patent application Ser. No. 15/114,276, which is a national stage application of PCT International Application No. PCT/JP2015/051469, filed on Jan. 21, 2015, which is based on and claims the benefit of priority of Japanese Patent Application No. 2014-013745 filed on Jan. 28, 2014. The contents of the aforementioned applications are incorporated herein by reference.

TECHNICAL FIELD

The present invention relates to a mobile station, a base station, and a communication control method.

BACKGROUND

The standardization of LTE-A (Long Term Evolution-Advanced) is currently under discussion in 3GPP (3rd Generation Partnership Project) as a next generation communication standard for LTE (Long Term Evolution). A carrier aggregation (CA) technology is introduced in an LTE-A system to maintain backward compatibility with an LTE system and to achieve higher throughput than the LTE system. According to the carrier aggregation technology, an LTE carrier (also referred to as a "component carrier") having a maximum bandwidth of 20 MHz, which is supported by the LTE system, is used as a basic component. Then, a plurality of component carriers are simultaneously used, thereby achieving broader bandwidth communication.

According to the carrier aggregation, a mobile station (UE: User Equipment) can communicate with a base station (eNB: evolved Node B), simultaneously using a plurality of component carriers. In the carrier aggregation, a primary component carrier (PCC) and a secondary component carrier (SCC) are used. The PCC is reliable and used to maintain connectivity with a mobile station. The SCC is additionally configured for a mobile station using the PCC.

A mobile station which supports carrier aggregation includes an RF (radio frequency) chain for each component carrier. Thus, such a mobile station includes two or more RF chains. When the mobile station only communicates using the PCC without using the SCC, the RF chain for the SCC is not used. Using the RF chain which is not used for the component carrier, a received level of an adjacent cell with a different frequency can be measured. This inter-frequency measurement is herein referred to as non-gap measurement. According to the non-gap measurement, an inter-frequency cell can be measured while maintaining communication using the PCC, which can alleviate reduction of throughput on the PCC.

However, when a state change (for example, power-on/power-off, frequency shift, and so on) occurs in the RF chain which is not used for communication, an instantaneous interruption arises in another RF chain which is used for communication. For example, upon power-on/power-off in the RF chain which is not used for communication in order to perform inter-frequency cell measurement, a noise is generated in the RF chain which is used for communication and thus data cannot be received.

SUMMARY

As described above, due to a state change in an RF chain which is not used for communication, an instantaneous interruption arises in another RF chain which is used for communication. FIG. 1 shows the case where inter-frequency measurement causes a packet loss. When a mobile station performs communication only using the PCC, inter-frequency measurement can be performed using an RF chain corresponding to the SCC. However, in the first subframe and the last subframe in the inter-frequency measurement duration, a state change occurs in the RF chain corresponding to the SCC, and then an instantaneous interruption arises in the PCC during communication. However, data are transmitted on the PCC regardless of the instantaneous interruption, which causes a packet loss in the subframe during which the instantaneous interruption arises.

In this case, it is possible to supplement a non-received packet by retransmission. However, since a packet is transmitted in the subframe during which an instantaneous interruption arises, radio resources are wasted and a link capacity is affected.

In order to avoid an instantaneous interruption in the RF chain which is used for communication, it is possible not to transmit data in the inter-frequency measurement duration according to non-gap measurement (see 3GPP TS 36.133 V11.6.0 (2013 September), Section 8.1.2.1 UE measurement Capability). FIG. 2 shows that a gap is provided for inter-frequency measurement. Specifically, a base station provides to a mobile station a gap where data are not allocated to six subframes corresponding to the inter-frequency measurement duration. In this case, radio resources can be saved because a packet is not transmitted in the subframe during which an instantaneous interruption arises. However, throughput in the mobile station is reduced.

It is a general object of the present invention to efficiently use radio resources and improve throughput in a mobile station, by providing a gap where data are not allocated to a subframe during which an instantaneous interruption arises, while a subframe during which an instantaneous interruption does not arise in the inter-frequency measurement duration is used for data communication.

In one aspect of the present invention, there is provided a mobile station which configures a plurality of component carriers to communicate with a base station, including:

a transmission unit configured to transmit to the base station a terminal capability associated with non-gap measurement indicating whether the mobile station is capable of performing inter-frequency measurement using a radio frequency (RF) chain which is not used for a component carrier;

a reception unit configured to receive whether to allow the non-gap measurement from the base station; and a communication control unit configured to control communication according to a gap pattern of using a portion of an inter-frequency measurement duration for data communication, when the non-gap measurement is allowed.

In another aspect of the present invention, there is provided a base station which configures a plurality of component carriers to communicate with a mobile station, including:

a reception unit configured to receive from the mobile station a terminal capability associated with non-gap measurement indicating whether the mobile station is capable of performing inter-frequency measurement using a radio frequency (RF) chain which is not used for a component carrier;

a transmission unit configured to transmit whether to allow the non-gap measurement to the mobile station; and a communication control unit configured to control communication according to a gap pattern of using a portion of an inter-frequency measurement duration for data communication, when the non-gap measurement is allowed.

In another aspect of the present invention, there is provided a communication control method in a mobile station which configures a plurality of component carriers to communicate with a base station, including the steps of:

transmitting to the base station a terminal capability associated with non-gap measurement indicating whether the mobile station is capable of performing inter-frequency measurement using a radio frequency (RF) chain which is not used for a component carrier;

receiving whether to allow the non-gap measurement from the base station; and controlling communication according to a gap pattern of using a portion of an inter-frequency measurement duration for data communication, when the non-gap measurement is allowed.

In another aspect of the present invention, there is provided a communication control method in a base station which configures a plurality of component carriers to communicate with a mobile station, including the steps of:

receiving from the mobile station a terminal capability associated with non-gap measurement indicating whether the mobile station is capable of performing inter-frequency measurement using a radio frequency (RF) chain which is not used for a component carrier;

transmitting whether to allow the non-gap measurement to the mobile station; and controlling communication according to a gap pattern of using a portion of an inter-frequency measurement duration for data communication, when the non-gap measurement is allowed.

According to the present invention, it is possible to efficiently use radio resources and improve throughput in a mobile station, by providing a gap where data are not allocated to a subframe during which an instantaneous interruption arises, while a subframe during which an instantaneous interruption does not arise in the inter-frequency measurement duration is used for data communication.

BRIEF DESCRIPTION OF THE DRAWINGS

FIG. 6 shows a flowchart of a communication control method according to an embodiment of the present invention.

DETAILED DESCRIPTION

Embodiments of the present invention are described below with reference to the accompanying drawings.

In an embodiment of the present invention, a mobile station and a base station which configure carrier aggregation for communication in a radio communication system such as an LTE-A (Long Term Evolution-Advanced) system are described below.

Figure 1:
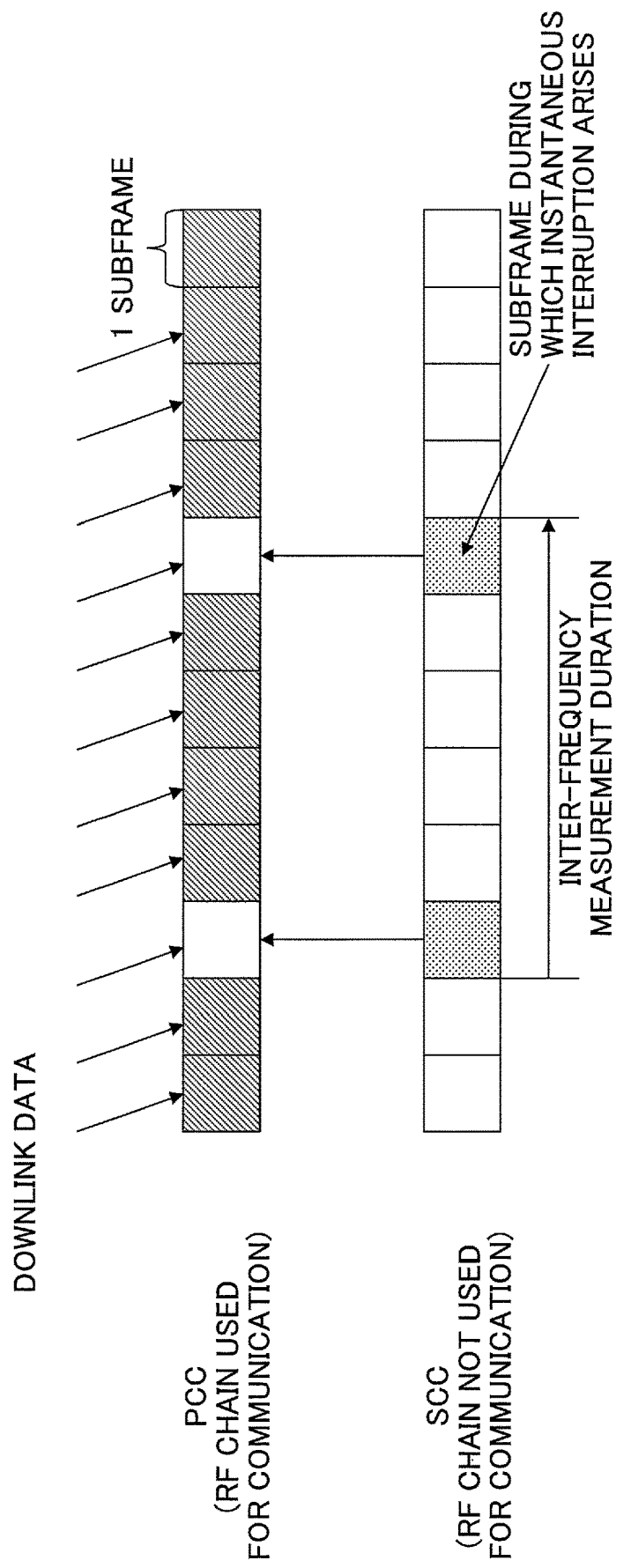
FIG. 1 shows the case where inter-frequency measurement causes a packet loss.

A mobile station which supports carrier aggregation includes two or more RF (radio frequency) chains. When the mobile station only communicates using the PCC without using the SCC, an RF chain is not used for the component carrier. The mobile station can measure an inter-frequency cell using the RF chain which is not used for the component carrier (non-gap measurement). As described above with reference to FIG. 1, when a state change occurs in the RF chain which is not used for the component carrier, an instantaneous interruption arises in another RF chain which is used for communication. Specifically, in the first subframe and the last subframe in the inter-frequency measurement duration, an instantaneous interruption arises due to a frequency shift and so on.

In an embodiment of the present invention, a gap pattern according to which data are not allocated to the subframe during which an instantaneous interruption arises in the inter-frequency measurement duration and the other subframes are used for data communication. A gap means that data are not allocated to a specified subframe, and a gap pattern represents a pattern indicating to which subframe data are not allocated.

Figure 3:
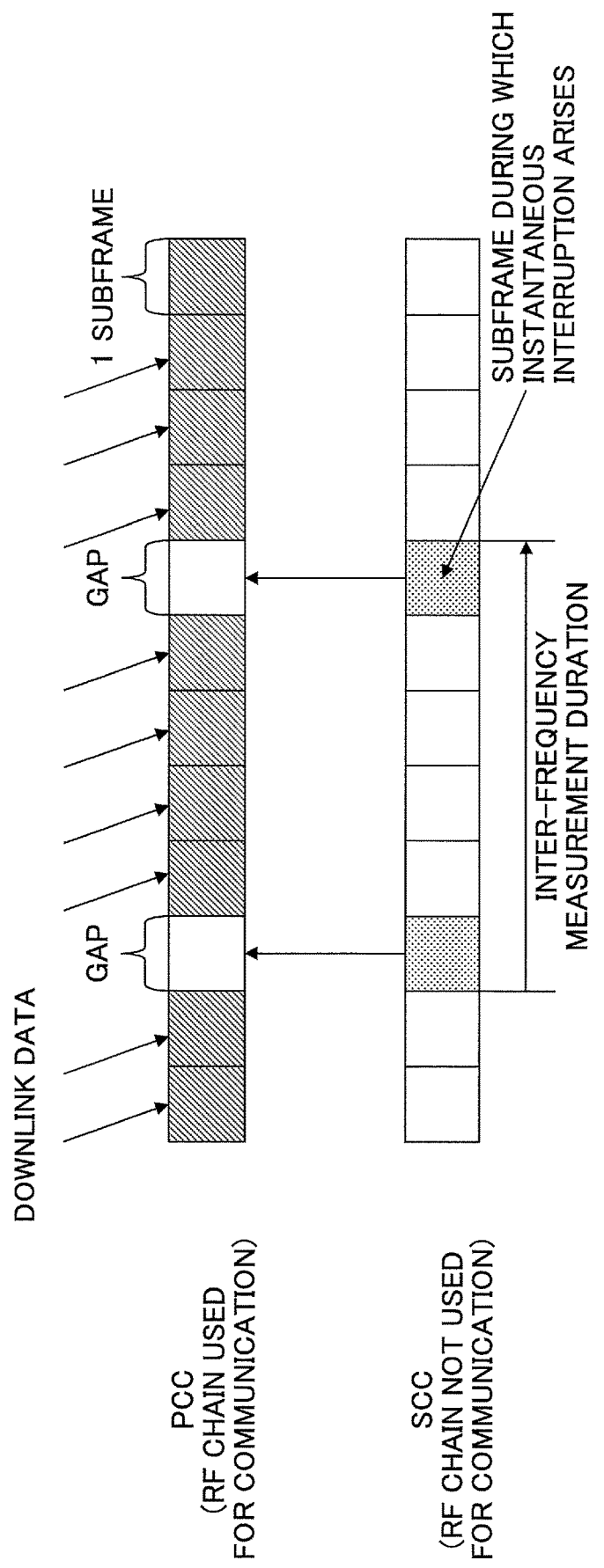
FIG. 3 shows that a gap is provided for inter-frequency measurement according to an embodiment of the present invention.

FIG. 3 shows that a gap is provided for inter-frequency measurement according to an embodiment of the present invention. Upon non-gap measurement, an instantaneous interruption arises in the first subframe and the last subframe in the inter-frequency measurement duration. Thus, data are not allocated to the first subframe and the last subframe in the inter-frequency measurement duration, but the other frames are used for data communication. Since the inter-frequency measurement duration is defined as six subframes according to the 3GPP standard, data are allocated to four subframes excluding the first subframe and the last subframe in an embodiment of the present invention. As a result, throughput in the mobile statin can be improved compared to the case where data are not allocated to six subframes. It should be noted that the inter-frequency measurement duration is not limited to six subframes, but may be any other number of subframes. It should be also noted that the subframes to which data are not allocated are not limited to the first subframe and the last subframe, but another pattern is possible such that data are not allocated to the first two subframes and the last two subframes, for example.

Since the first subframe and the last subframe are not used for data communication, a packet loss caused by an instantaneous interruption can be avoided. In addition, since the first subframe and the last subframe to which data are not allocated can be used for communication by another mobile station, radio resources can be efficiently used.

In an embodiment of the present invention, in order to achieve non-gap measurement as described above, the mobile station transmits a terminal capability (UE Capability) associated with non-gap measurement. The base station transmits whether to allow non-gap measurement based on the received terminal capability. When non-gap measurement is allowed by the base station, more specifically, when non-gap measurement is allowed where a portion (subframes other than the first subframe and the last subframe in the inter-frequency measurement duration) of the inter-frequency measurement duration is used for data communication, the mobile station performs communication according to the gap pattern of using the portion for data communication.

<Device Configuration>

Figure 4:
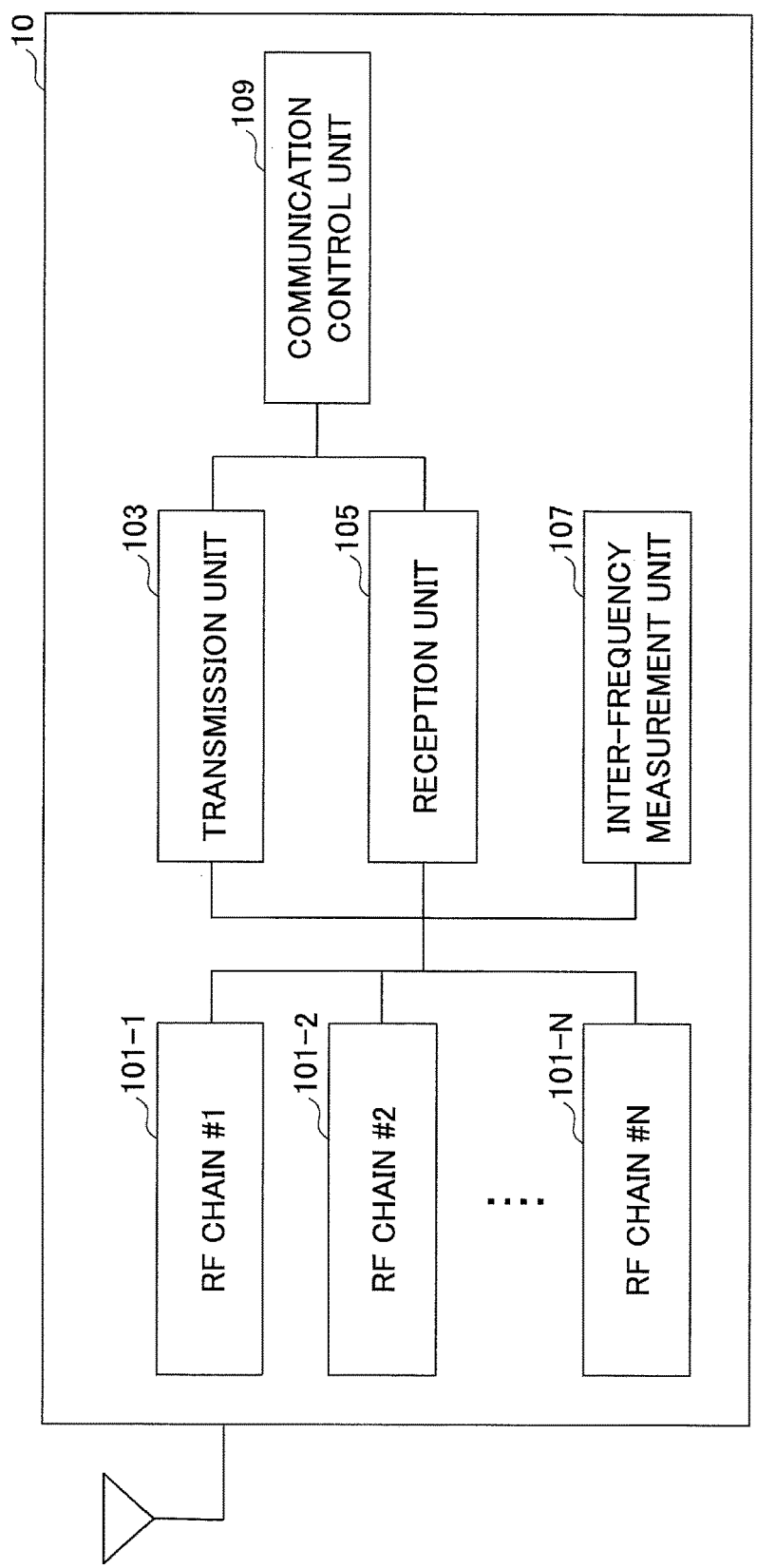
FIG. 4 shows a block diagram of a mobile station according to an embodiment of the present invention.

FIG. 4 shows a block diagram of a mobile station 10 according to an embodiment of the present invention. The mobile station 10 supports carrier aggregation and configures a plurality of component carriers to communicate with a base station.

The mobile station 10 includes RF chains 110-1, ..., 101-N, a transmission unit 103, a reception unit 105, an inter-frequency measurement unit 107, and a communication control unit 109.

The RF chain 101-1, ..., 101-N is a circuit to convert a baseband signal to an RF signal and convert an RF signal to a baseband signal. For example, the RF chain 101-1, ..., 101-N includes a modulator-demodulator, a filter, an amplifier, and so on. The mobile station which supports carrier aggregation includes two or more RF chains. One of the RF chains is used for communication using the PCC and the other RF chains are used for communication using the SCC.

The transmission unit 103 transmits data and control information via the RF chains 101-1, ..., 101-N and an antenna to the base station. Specifically, the transmission unit 103 transmits to the base station a terminal capability associated with non-gap measurement indicating whether the mobile station is capable of performing inter-frequency measurement using an RF chain which is not used for a component carrier. The terminal capability may be transmitted for each combination of CA bands (component carriers). This is because whether to allow non-gap measurement is determined depending upon the combination of CA bands. For example, when an RF chain corresponding to 2 GHz band is available (not used) while communicating using an RF chain corresponding to 800 MHz band, it is not structurally possible for the mobile station to perform measurement of 700 MH band using the available RF chain. For this combination of CA bands, the mobile station does not have a terminal capability associated with non-gap measurement. For example, when one PCC and one SCC are configured, one combination of CA bands is possible. When one PCC and two SCCs are configured, three combinations of CA bands are possible.

The reception unit 105 receives data and control information via the RF chains 101-1, ..., 101-N and the antenna from the base station. Specifically, the reception unit 105 receives whether to allow non-gap measurement from the base station. The reception unit 105 may also receive a period of an inter-frequency measurement duration or the like.

The inter-frequency measurement unit 107 measures an inter-frequency cell using an RF chain which is not used for a component carrier. The period of the measurement of the inter-frequency cell complies with the period of the inter-frequency measurement duration received from the base station.

Figure 2:
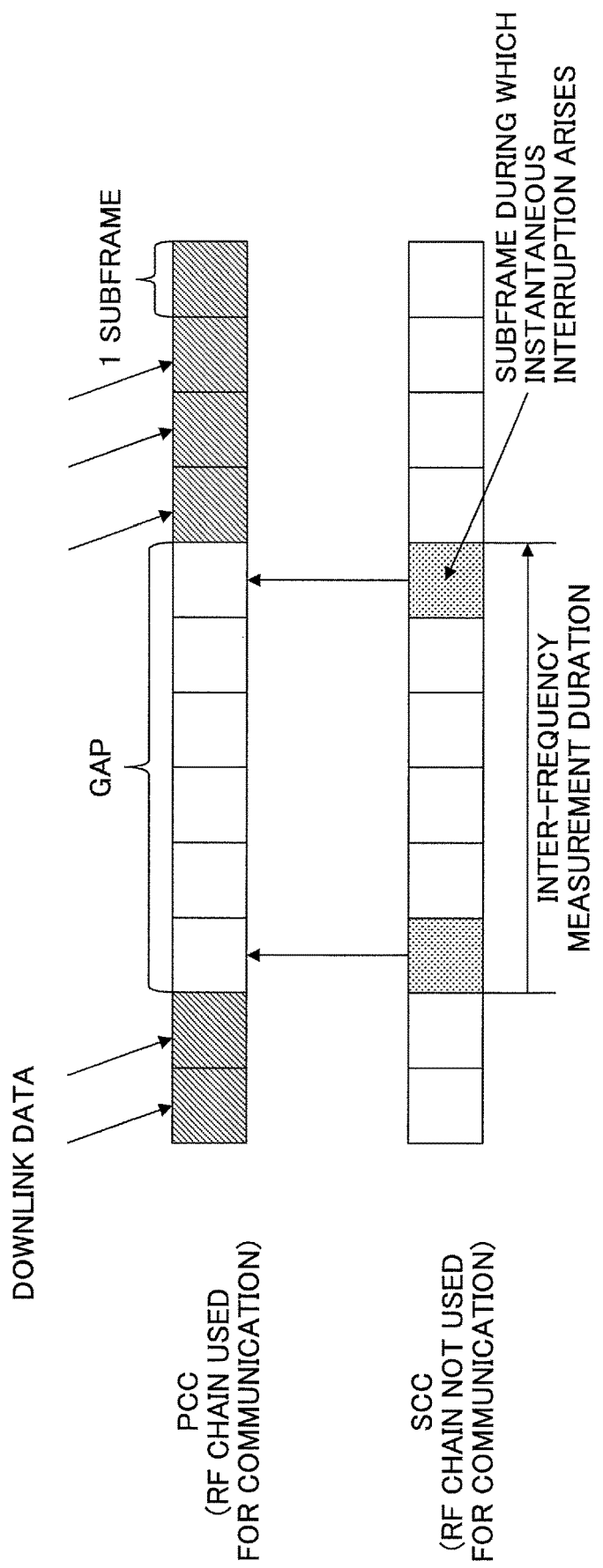
FIG. 2 shows that a gap is provided for inter-frequency measurement.

The communication control unit 109 controls transmission and/or reception of data according to whether to allow non-gap measurement received from the base station. When non-gap measurement is allowed by the base station, that is, when non-gap measurement is allowed where a portion of the inter-frequency measurement duration is used for data communication, the communication control unit 109 controls communication according to the gap pattern of using the portion for data communication. More specifically, the communication control unit 109 considers that data are not allocated to only the first subframe and the last subframe in the inter-frequency measurement duration as shown in FIG. 3. Accordingly, when downlink data are received from the base station in four subframes excluding the first subframe and the last subframe in the inter-frequency measurement duration, the received downlink data are processed by the mobile station. When non-gap measurement is not allowed by the base station, that is, when non-gap measurement is not allowed where a portion of the inter-frequency measurement duration is used for data communication, the communication control unit 109 may control communication according to the gap pattern of not allocating data in the inter-frequency measurement duration as shown in FIG. 2.

Figure 5:
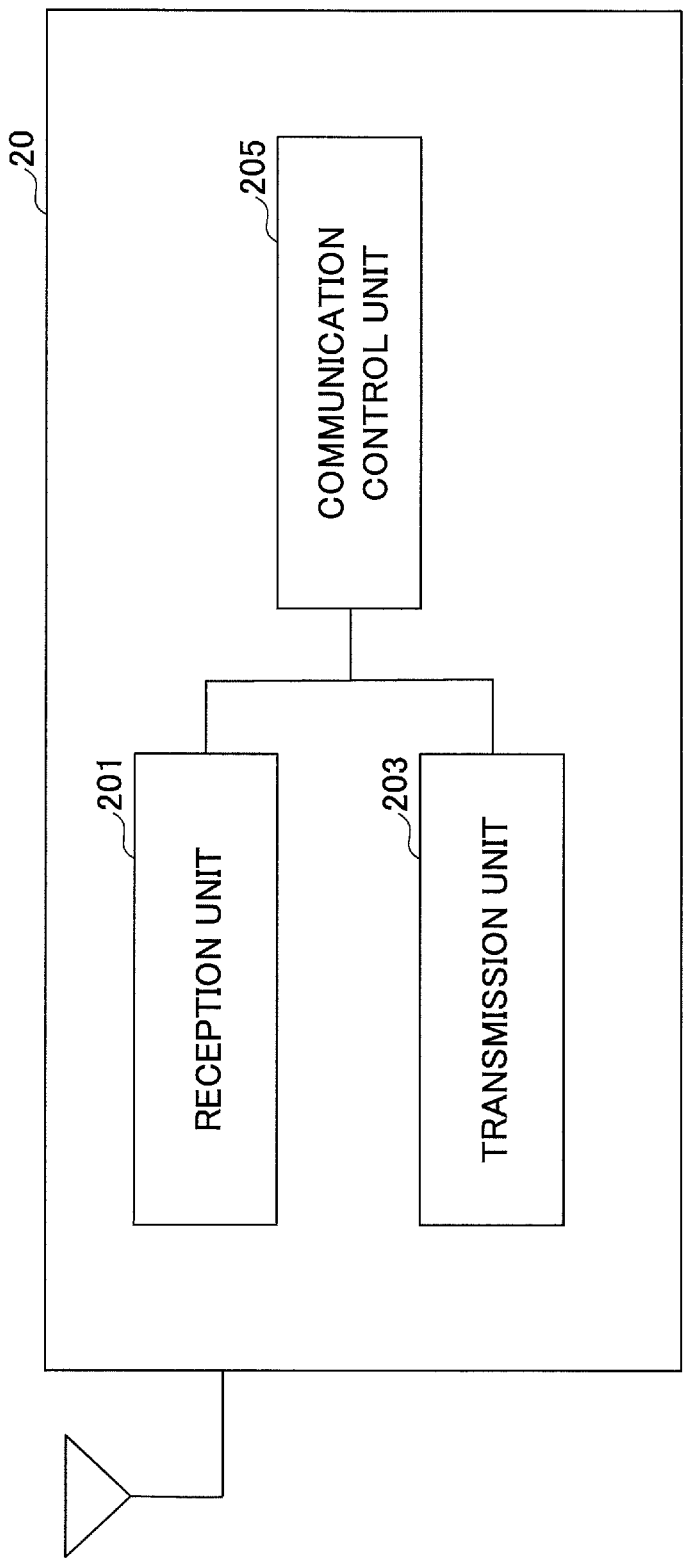
FIG. 5 shows a block diagram of a base station according to an embodiment of the present invention.

FIG. 5 shows a block diagram of a base station according to an embodiment of the present invention. The base station 20 supports carrier aggregation and configures a plurality of component carriers to communicate with a base station.

The base station 20 includes a reception unit 201, a transmission unit 203, and a communication control unit 205. In a similar manner to the mobile station shown in FIG. 4, the base station 10 includes a circuit (not shown) to convert a baseband signal to an RF signal and convert an RF signal to a baseband signal.

The reception unit 201 receives data and control information via an antenna from the mobile station. Specifically, the reception unit 201 receives from the mobile station a terminal capability associated with non-gap measurement indicating whether the mobile station is capable of performing inter-frequency measurement using an RF chain which is not used for a component carrier.

The transmission unit 203 transmits data and control information via the antenna to the mobile station. Specifically, the transmission unit 203 transmits whether to allow non-gap measurement, which is determined according to the terminal capability, to the mobile station. Whether to allow non-gap measurement is a result of determining whether to actually apply to the mobile station non-gap measurement where a portion of the inter-frequency measurement duration is used for data communication. When non-gap measurement is allowed, the transmission unit 203 may transmit a gap pattern including the inter-frequency measurement duration and a period of inter-frequency measurement to the mobile station. The gap pattern may be specified by an ID among predefined patterns. When the terminal capability is transmitted for each combination of CA bands, whether to allow non-gap measurement is also transmitted for each combination of CA bands. The transmission unit 203 may also transmit a period of inter-frequency measurement duration.

The communication control unit 205 controls transmission and reception of data according to whether to allow non-gap measurement transmitted to the mobile station. When non-gap measurement is allowed, that is, when non-gap measurement is allowed where a portion of the inter-frequency measurement duration is used for data communication, the communication control unit 205 controls communication according to the gap pattern of using the portion for data communication. More specifically, the communication control unit 205 does not allocate data to only the first subframe and the last subframe in the inter-frequency measurement duration as shown in FIG. 3. When non-gap measurement is not allowed, that is, when non-gap measurement is not allowed where a portion of the inter-frequency measurement duration is used for data communication, the communication control unit 205 may control communication according to the gap pattern of not allocating data in the inter-frequency measurement duration as shown in FIG. 2.

<Operational Method>

FIG. 6 shows a flowchart of a communication control method according to an embodiment of the present invention.

First, in step S101, the mobile station transmits to the base station a terminal capability indicating whether the mobile station is capable of performing non-gap measurement. The terminal capability may be transmitted for each combination of CA bands.

Then, in step S103, when the base station receives the terminal capability from the mobile station, the base station transmits to the mobile station whether to allow non-gap measurement, that is, whether to actually apply non-gap measurement. Whether to allow non-gap measurement may be transmitted for each combination of CA bands.

In step S105, the base station transmits a gap pattern ID including the inter-frequency measurement duration and a period of inter-frequency measurement. Based on the gap pattern ID, the inter-frequency measurement duration and the period of inter-frequency measurement are established.

When non-gap measurement is allowed in step S103, that is, when non-gap measurement is allowed where a portion of the inter-frequency measurement duration is used for data communication, in step S107, the mobile station considers that data are not allocated to only the first subframe and the last subframe in the inter-frequency measurement duration and also considers that the other subframes are used for data communication. Then, the mobile station measures an inter-frequency cell according to the gap pattern specified in step S105.

When non-gap measurement is not allowed in step S103, that is, when non-gap measurement is not allowed where a portion of the inter-frequency measurement duration is used for data communication, in step S109, the mobile station considers that data are not allocated in the inter-frequency measurement duration. Then, the mobile station measures an inter-frequency cell according to the gap pattern specified in step S105.

It should be noted that whether to allow non-gap measurement, which is transmitted from the base station to the mobile station, may be a notification of whether to allow non-gap measurement where a portion of the inter-frequency measurement duration is used for data communication or may be a mere notification whether to allow non-gap measurement. When the mere notification whether to allow non-gap measurement is used, the base station and the mobile station determine that whether to allow non-gap measurement is equivalent to whether to allow non-gap measurement where a portion of the inter-frequency measurement duration is used for data communication.

<Effects of Embodiments of the Present Invention>

According an embodiment of the present invention, since the first subframe and the last subframe, during which an instantaneous interruption arises, in the inter-frequency measurement duration are not used for data communication, a packet loss caused by the instantaneous interruption can be avoided. In addition, since the first subframe and the last subframe to which data are not allocated can be used for communication by another mobile station, radio resources can be efficiently used. Moreover, compared to the case where data are not allocated to all the subframes in the inter-frequency measurement duration as shown in FIG. 2, throughput in the mobile station can be improved.

The transmission of the terminal capability from the mobile station to the base station may be implemented using a UE Capability defined with ASN.1 in the 3GPP standard. The configuration of the gap in the base station may be implemented using a Gap pattern defined with ASN.1 in the 3GPP standard. Thus, the mobile station and the base station according to an embodiment of the present invention can be promptly realized using the framework of the 3GPP standard.

For convenience of explanation, the base station and the mobile station according to the embodiments of the present invention have been described with reference to functional block diagrams, but the base station and the mobile station may be implemented in hardware, software, or combinations thereof. In addition, two or more functional elements may be combined as appropriate. The communication control method according to the embodiments of the present invention has been described with reference to a flowchart representing a process flow, but the communication control method may be carried out in a different order from the order shown in the embodiments.

While the approaches are described above to efficiently use radio resources and improve throughput in a mobile station, by providing a gap where data are not allocated to a subframe during which an instantaneous interruption arises, while a subframe during which an instantaneous interruption does not arise in the inter-frequency measurement duration is used for communication, the present invention is not limited to the embodiments, but various modifications and applications can be made by those skilled in the art within the scope of the claims.

DESCRIPTION OF NOTATIONS 10 mobile station
101-1, . . . , 101-N RF chain
103 transmission unit
105 reception unit
107 inter-frequency measurement unit
109 communication control unit
20 base station
201 reception unit
203 transmission unit
205 communication control unit

The invention claimed is:

1. A mobile station which configures a plurality of component carriers to communicate with a base station, comprising:
    a receiver configured to receive from the base station a gap pattern according to which a portion of an inter-frequency measurement duration is used for data communication; and
    a processor configured to control communication according to the gap pattern.

2. The mobile station as claimed in claim 1,
    wherein, according to the gap pattern, a first subframe and a last subframe in the inter-frequency measurement duration are not used for the data communication and other subframes in the inter-frequency measurement duration are used for the data communication.

3. The mobile station as claimed in claim 2, further comprising:
    a transmitter configured to transmit to the base station a terminal capability.

4. The mobile station as claimed in claim 1, further comprising:
    a transmitter configured to transmit to the base station a terminal capability.

5. A base station which configures a plurality of component carriers to communicate with a mobile station, comprising:
    a transmitter configured to transmit to the mobile station a gap pattern according to which a portion of an inter-frequency measurement duration is used for data communication; and a processor configured to control communication according to the gap pattern.

6. A communication control method in a mobile station which configures a plurality of component carriers to communicate with a base station, comprising the steps of:
  receiving from the base station a gap pattern according to which a portion of an inter-frequency measurement duration is used for data communication; and
  controlling communication according to the gap pattern.

7. A communication control method in a base station which configures a plurality of component carriers to communicate with a mobile station, comprising the steps of:
  transmitting to the mobile station a gap pattern according to which a portion of an inter-frequency measurement duration is used for data communication; and
  controlling communication according to the gap pattern.

* * * * *